United States Patent
Leopold et al.

(10) Patent No.: US 6,269,242 B1
(45) Date of Patent: Jul. 31, 2001

(54) DYNAMIC BEAM FILL-IN SYSTEM AND METHOD THEREFOR

(75) Inventors: Raymond J. Leopold, Tempe; Jeffrey C. Morrow, Phoenix; Jeffrey D. Laub, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/376,423

(22) Filed: Aug. 18, 1999

(51) Int. Cl.[7] .................................................. H04B 7/185
(52) U.S. Cl. .............................. 455/427; 455/12.1; 455/8
(58) Field of Search .................................. 455/427, 429, 455/430, 12.1, 13.1–13.3, 8, 446, 447, 561, 562

(56) References Cited

U.S. PATENT DOCUMENTS

| | | | |
|---|---|---|---|
| 5,367,304 | 11/1994 | Jan et al. | 342/352 |
| 5,448,621 | 9/1995 | Knudsen | 379/58 |
| 5,813,634 * | 9/1998 | Pizzicaroli et al. | 455/427 |
| 5,862,479 | 1/1999 | Cutler, Jr. et al. | 455/428 |
| 6,021,309 * | 2/2000 | Sherman et al. | 455/12.1 |
| 6,055,431 * | 4/2000 | Dybdal | 455/450 |
| 6,104,911 * | 8/2000 | Diekelman | 455/13.1 |
| 6,138,012 * | 10/2000 | Krutz et al. | 455/427 |

FOREIGN PATENT DOCUMENTS

| | | | |
|---|---|---|---|
| 1014598 * | 6/2000 | (EP) | H04B/7/185 |

* cited by examiner

*Primary Examiner*—Vivian Chang
*Assistant Examiner*—Duc Nguyen
(74) *Attorney, Agent, or Firm*—Frank J. Bogacz (57) ABSTRACT

A dynamic beam fill-in system (40) in a cellular communications network (20) having a constellation (22) of satellites (24) in orbit (26) with each satellite (24) having a plurality of antennas (30) configured to form cells (36) upon the surface (34) of the Earth. A first antenna (130) is configured to form a first cell (136) at a first location (144) for a first period (156) of time and at a second location (244) for a second period (256) of time. A second antenna (230) is configured to form a second cell (236) at least partially coincident with the first cell (136) during the first period (156). A third antenna (330) is configured to form a third cell (336) at least partially coincident with the first cell (136) during the second period (256). In the event of failure of the first antenna (130), a computer program (66), in response to a beam-replacement table (54), is configured to deactivate the first antenna (130) and activate the second antenna (230) during the first period (156) and the third antenna (330) during the second period (256).

20 Claims, 8 Drawing Sheets

DYNAMIC BEAM FILL-IN SYSTEM AND METHOD THEREFOR

TECHNICAL FIELD OF THE INVENTION

The present invention relates to the field of cellular communications. More specifically, the present invention relates to beam fill-in in satellite-based cellular communications.

BACKGROUND OF THE INVENTION

In satellite-based cellular communications, a plurality of satellites in orbit about the Earth are used to form communications cells upon the surface of the Earth. Cellular telephones and ground stations located within these cells communicate with each other through the satellites.

In a typical cellular communications system, the satellites form a dynamic constellation in a series of polar low-Earth orbits. Each satellite in the constellation typically generates a footprint of cells upon the surface of the Earth. These footprints tend to cluster or overlap, particularly at the poles. That is, because of the polar orbits, the footprints of adjacent satellites tend to have minimal overlap at the equator and maximal overlap near the poles.

A given satellite may form its footprint via an antenna array, where each antenna in the array generates a beam configured to form a single cell upon the surface of the Earth. If an antenna were to fail to produce a proper beam, the resultant cell would not be formed and there would be a communications hole within the footprint.

Various methods have been used to reassign the beams of other satellites to provide coverage for such a hole, i.e., to provide beam fill-in. Such methods have depended upon ground stations to update one-orbit tables within the satellites. These one-orbit tables work well as long as the hardware involved is operating properly. In the event of an antenna failure, however, the beam generated by that antenna may be out of service for up to a full orbit. This may represent a significant loss of communications and the revenue generated thereby, along with customer satisfaction.

What is needed is to dynamically monitor the operation of each antenna of each satellite in the network, and, in the event of a failure, provide dynamic beam fill-in for the failed antenna. In this manner, few communications holes would be allowed to exist for more than a few seconds, thus markedly increasing the reliability of the communications network, the revenue derived therefrom, and the customer satisfaction.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Throughout this discussion, a two-digit reference number shall indicate a generic item. A three-digit reference numbers having first digit of "1" through "8" shall indicate specific ones of the item indicated by the second and third digits.

A number having a prime (') or double prime (") indicates an active or inactive version of the item indicated by the number, respectively.

Figure 1:
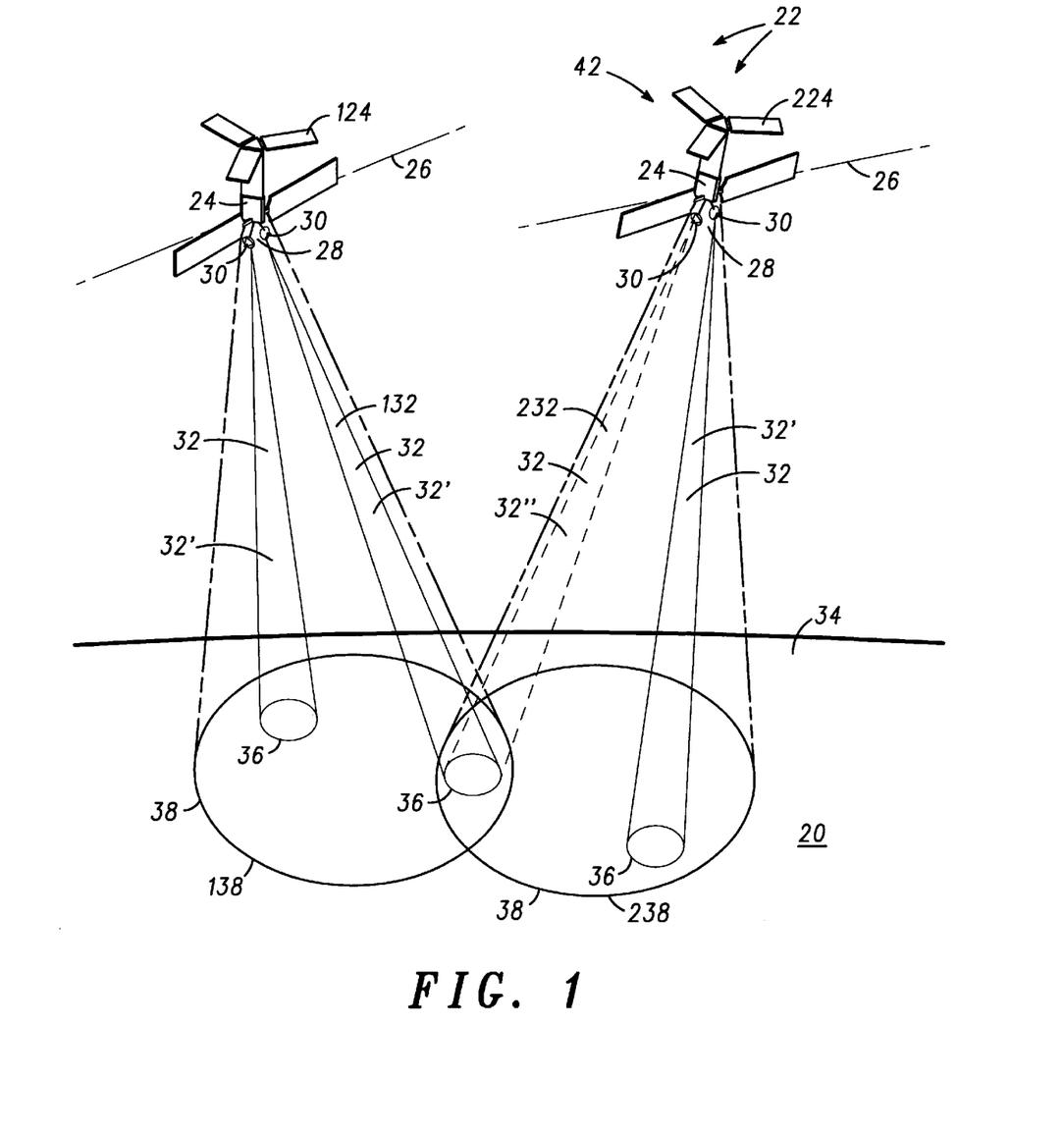
FIG. 1 shows a schematic representation of a portion of a cellular communications network incorporating a plurality of satellites in orbits above the surface of the Earth and demonstrating overlapping footprints in accordance with a preferred embodiment of the present invention.

FIG. 1 shows a schematic representation of a portion of a cellular communications network 20 having a constellation 22 incorporating a plurality of satellites 24 in low-Earth orbits 26 in accordance with a preferred embodiment of the present invention.

Each satellite 24 in constellation 22 has an antenna array 28 made up of a plurality of antennas 30. Each antenna 30 in each array 28 forms a communications beam 32 between its satellite 24 and the surface 34 of the Earth (hereinafter surface 34). The area of surface 34 covered by a single beam 32 is a communications cell 36. Antennas of a given array 28, i.e., of a given satellite 24, form a footprint 38 made up of cells 36. Although satellite is used throughout this patent application, it is readily understandable that an airplane or other flying object, located below the constellation, is included in the scope of the present invention.

Even though this discussion presumes above-described network 20 as the preferred embodiment, those skilled in the art will appreciate that other networks 20, other orbits 26, other constellations 22, other satellites 24, and/or other antennas 30 than those described in this discussion may be employed without departing from the spirit of the present invention.

Throughout this discussion, variations of the phrase "antenna 30 forms cell 36" are used for simplicity. This should be clearly understood to mean that satellite 24 has antenna 30, antenna 30 forms beam 32, and beam 32 forms cell 36. Forming is a correlative operation, i.e., satellite 24 and/or antenna 30 forms beam 32 and/or cell 36.

It should also be clearly understood that what is meant is that antenna 30 is configured to form cell 36 when active. That is, an active antenna 30' forms an active beam 32' and an active cell 36'. On the other hand in FIG. 2, an inactive antenna 30" forms an inactive beam 32" and an inactive cell 36". Those skilled in the art will appreciate that inactive beam 32" and inactive cell 36" do not in actuality exist, but are the beam 32 and cell 36 that would be formed were inactive antenna 30" to be made active. For the purposes of this discussion, inactive beam 32" and inactive cell 36" will be read as real and existing.

Figure 2:
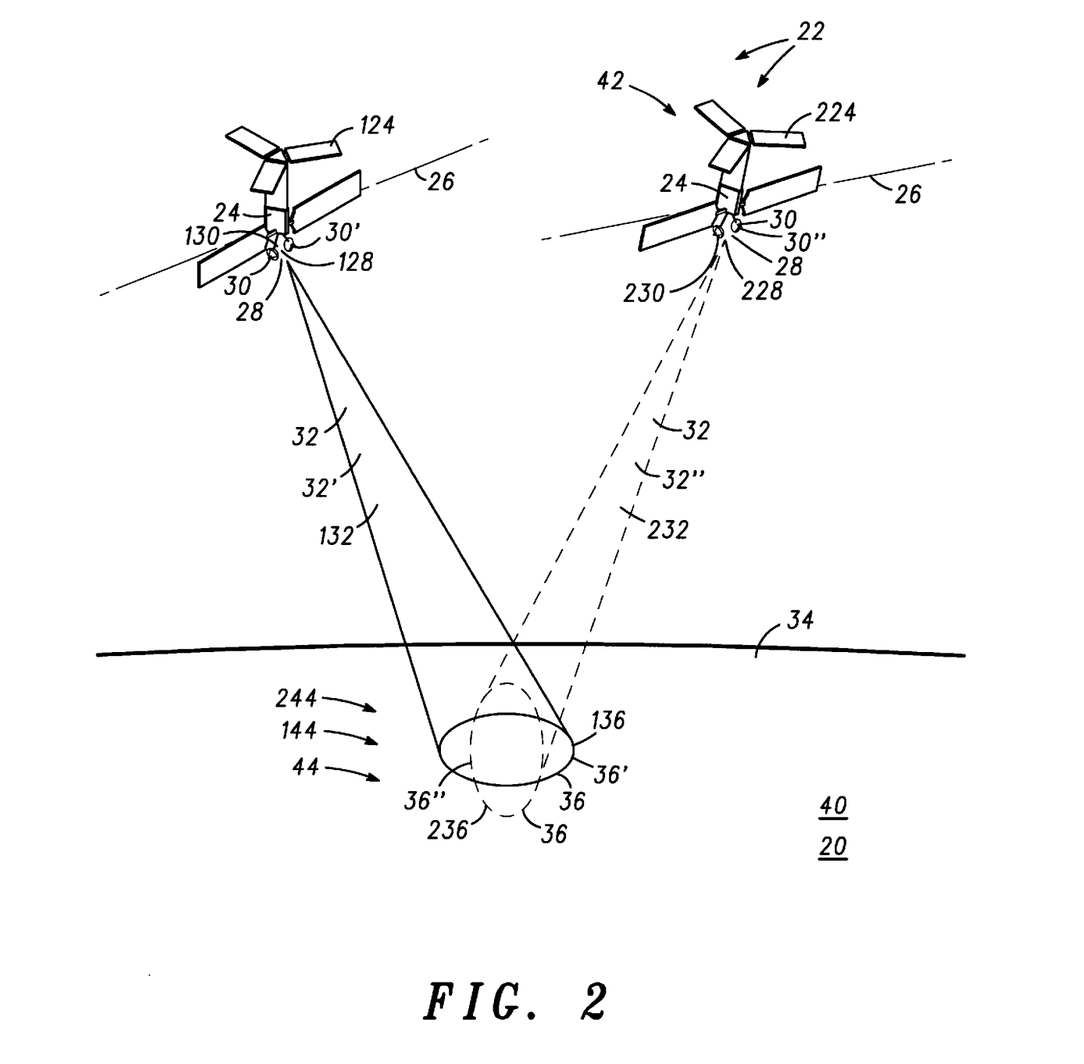
FIG. 2 shows a schematic representation of a first satellite forming a first cell and a second satellite forming a second cell overlapping the first cell demonstrating normal operation in accordance with a preferred embodiment of the present invention.
Figure 3:
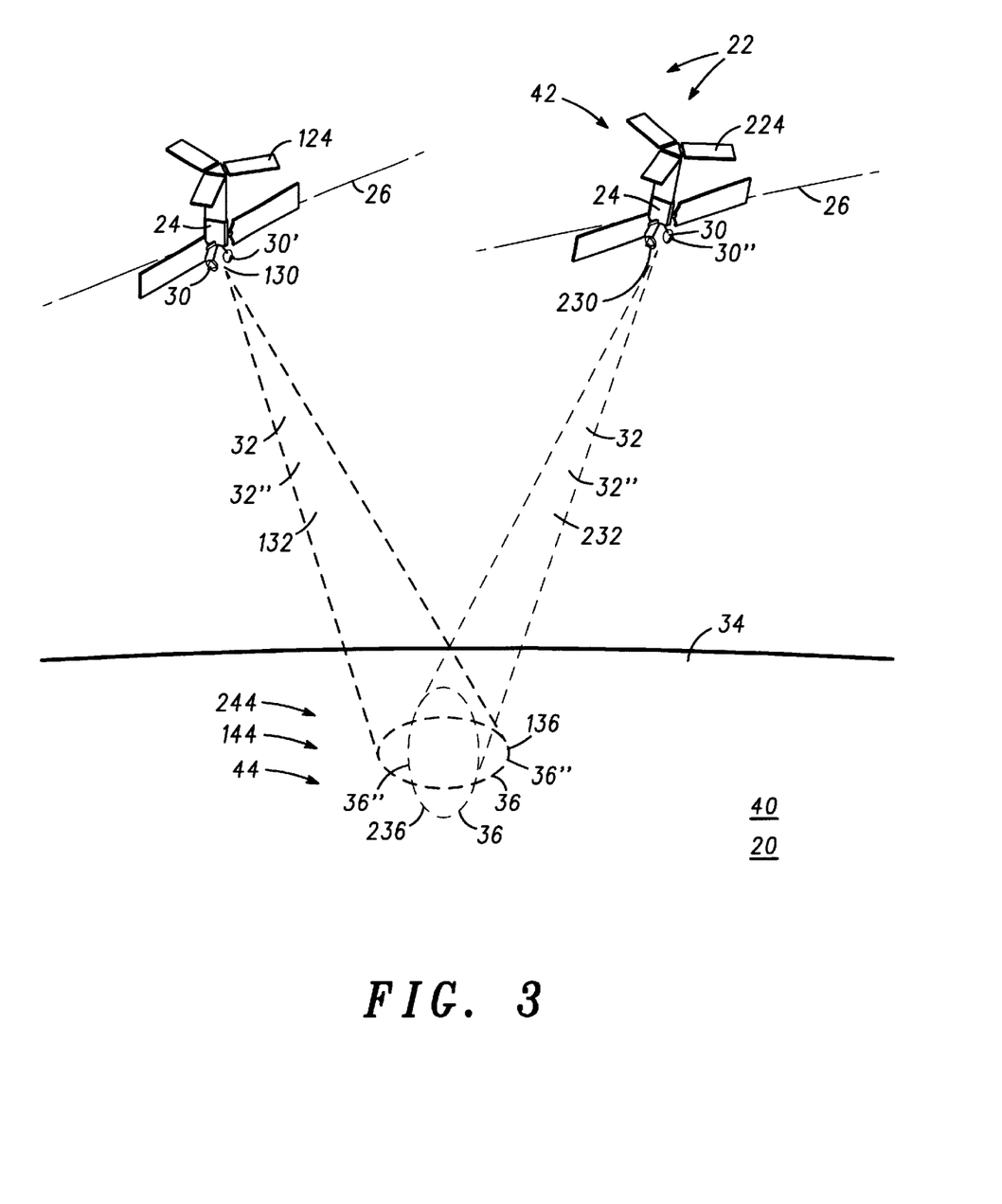
FIG. 3 shows a schematic representation of the satellites of FIG. 2 demonstrating a failure of a first antenna on the first satellite in accordance with a preferred embodiment of the present invention.
Figure 4:
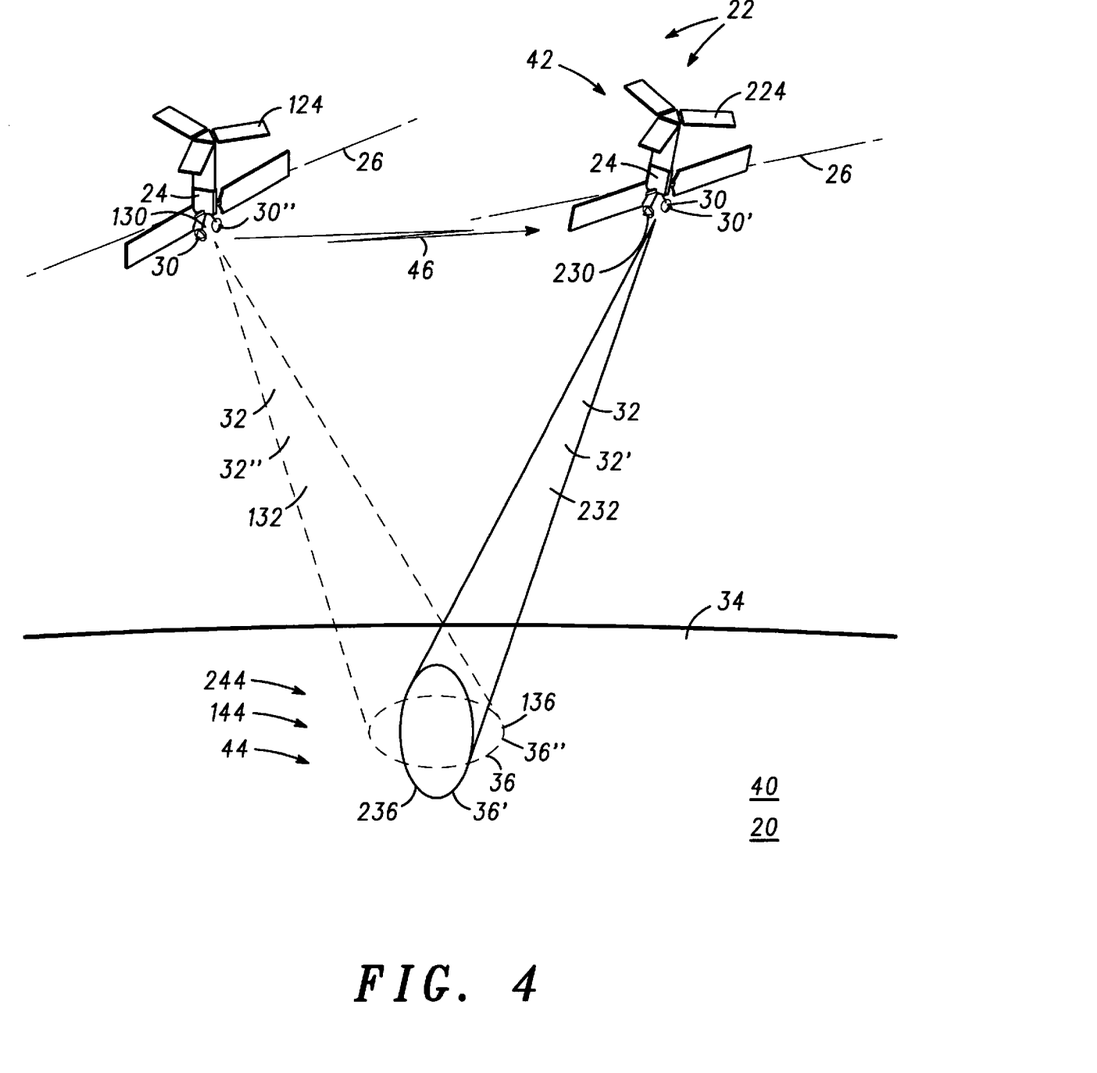
FIG. 4 shows a schematic representation of the satellites of FIG. 2 demonstrating replacement of the first antenna by a second antenna on the second satellite in accordance with a preferred embodiment of the present invention.

FIGS. 2, 3, and 4 show schematic representations of a subject satellite 124 forming a subject cell 136 and a recovery satellite 224 forming a recovery cell 236, with recovery cell 236 overlapping subject cell 136 in accordance with a preferred embodiment of the present invention. FIG. 2 demonstrates normal operation, FIG. 3 demonstrates a failure of a subject antenna 130 on subject satellite 124, and FIG. 4 demonstrates a replacement of subject cell 136 by recovery cell 236. The following discussion refers to FIGS. 1 through 4.

For purposes of discussion, any given satellite 24 within constellation 22 shall be assumed to be subject satellite 124. Subject satellite 124 is unique only in that it has been arbitrarily chosen as a reference, and any satellite 24 in constellation 22 may be subject satellite 124.

Subject satellite 124 has an antenna 30 (subject antenna 130) which fails during a period of time germane to the discussion. Antenna 30 fails when, for any reason, subject satellite 124 determines that subject antenna 130 cannot or will not provide appropriate transmission and/or reception of communications. Subject satellite 124 may make such a determination as a result of internal testing, upon a failure to effect local communications, or upon notification by another component of network 20 of a failure to effect remote communications. Subject antenna 130 may be any antenna 30 within antenna array 28 of subject satellite 124. Subject antenna 130 forms a subject beam 132 and subject cell 136. At any instant during the germane period of time, the mode (active, inactive) or status (is operational, has failed) of subject beam 132 and subject cell 136 is the status of subject antenna 130.

A beam fill-in system 40 is incorporated into network such that all satellites 24 of constellation 22 are included in system 40. For purposes of simplicity and clarity, however, system 40 shall be discussed herein as it applies to subject satellite 124.

Since orbits 26 are preferrably low-Earth orbits 26, satellites 24 are positioned within constellation 22 so that substantially the entirety of surface 34 is covered by overlapping footprints 38 on line-of-sight bases. Therefore, subject satellite 124 is surrounded by a plurality of other satellites 24 having footprints 38 at least partially overlapping footprint 38 of subject satellite 124.

Overlapping-footprint satellites 24 leading or trailing subject satellite 124 in the same orbit 26 have footprints 38 that overlap footprint 38 of subject satellite 124 in a fixed manner. That is, because a preceding satellite 24, subject satellite 124, and a following satellite 24 are in the same orbit 26, their relationship remains constant as they orbit the Earth.

On the other hand, overlapping-footprint satellites 24 in different orbits 26 have footprints 38 that overlap footprint 38 of subject satellite 124 in a dynamically varying manner. Indeed, since orbits 26 are preferably, although not necessarily, polar orbits 26, overlapping footprints 38 have minimal overlap proximate the equator and maximal overlap proximate the poles.

Footprints 38 are made up of cells 36. Therefore, when footprints 38 overlap, it is actually cells 36 in differing footprints 38 that overlap. For purposes of this discussion, it may be assumed that network 20 exerts control over constellation 22 such that, when two or more cells 36 overlap significantly, only one of those cells 36 is an active cell 36'. Those skilled in the art will appreciate that there are special circumstances when more than one overlapping cell 36 may simultaneously be active. Such circumstances are beyond the scope of this discussion and depart from the spirit of the present invention.

When subject antenna 130 fails, then subject beam 132 and subject cell 136 also fail. That portion of failed subject cell 136 not overlapped by an adjacent operable cell 36' represents a communications hole upon surface 34. System 40 is attempting to replace the failed portion of the subject cell 136 with recovery cell 236 which overlaps cell 136 and is operable, but currently inactive.

Within constellation 22 a plurality of satellites 24 dynamically form cells 36 that at least partially overlap subject cell 136 for time to time. This plurality of satellites 24 is hereinafter referred to as an overlapping subconstellation 42. Recovery satellite 224 is that satellite 24 within overlapping subconstellation 42 having an antenna 30 (a recovery antenna 230) that forms a beam 32 (recovery beam 232) that forms a cell 36 (recovery cell 236) having a greater overlap of subject cell 136 than cells 36 formed by other antennas 24 of overlapping subconstellation 42.

In the preferred embodiment, recovery satellite 224 is a satellite 24 of overlapping subconstellation 42. Overlapping subconstellation 42 includes subject satellite 124. Under certain circumstances, recovery satellite 224 may be subject satellite 124. That is, recovery antenna 230 may be an antenna 30 of subject satellite 124 other than subject antenna 130. However, for the purposes of this discussion, it will be assumed that recovery satellite 224 is a satellite 24 of overlapping subconstellation 42 other than subject satellite 124.

In FIG. 2, subject satellite 124 has subject antenna 130 forming subject cell 136 at a location 44 upon surface 34. Recovery satellite 224 has recovery antenna 230 forming recovery cell 236 at least partially coincident with subject cell 136. Subject antenna 130 is an active antenna 30' and recovery antenna 230 is an inactive antenna 30". Subject cell 136 is an active cell 36' and communications between location 44 and network 20 may take place via subject cell 136, subject beam 132, and subject antenna 130.

In FIG. 3, subject antenna 130 has failed. That is, subject antenna 130 can no longer form an active and operable subject cell 136, and communications between location 44 and network 20 have ceased. The possible reasons for a failure of subject antenna 130 are well known to those skilled in the art and beyond the scope of this discussion.

In FIG. 4, system 40 has provided beam fill-in for location 44. Subject satellite 124 has detected the failure of subject antenna 130 and instructed recovery satellite 224 to activate recovery antenna 230 via an inter-satellite signal 46. Recovery satellite 224 has activated recovery antenna 230. Recovery cell 236 is now an active cell 36' and communications between location 44 and network 20 may take place via recovery cell 236, recovery beam 232, and recovery antenna 230. Beam fill-in has been successfully accomplished. The recover beam may be located in the subject satellite or another satellite. The subject vehicle or another vehicle may make the determination that a beam fill-in is required.

Figure 5:
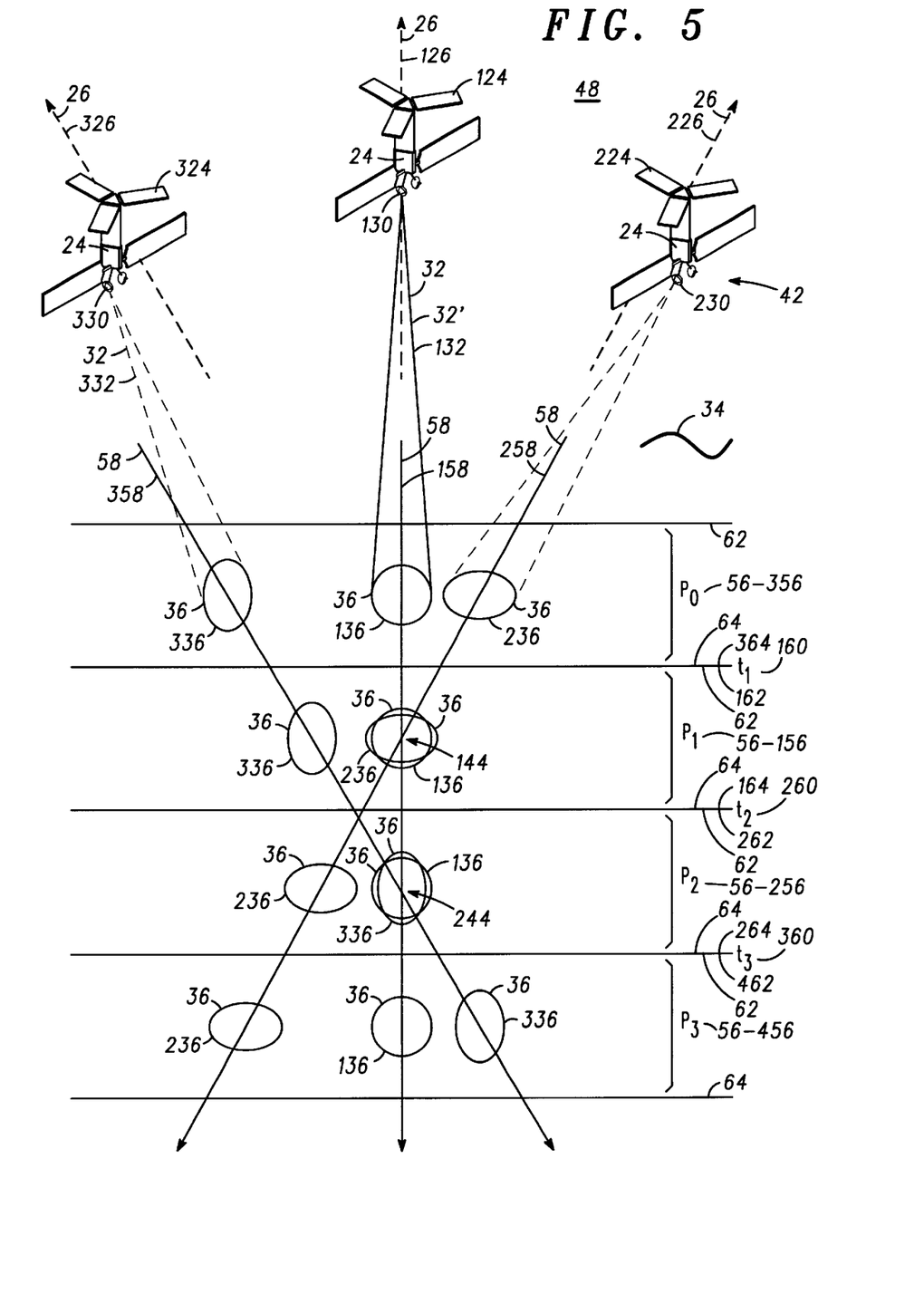
FIG. 5 shows a map depicting beam fill-in sequences in accordance with a preferred embodiment of the present invention.
Figure 6:
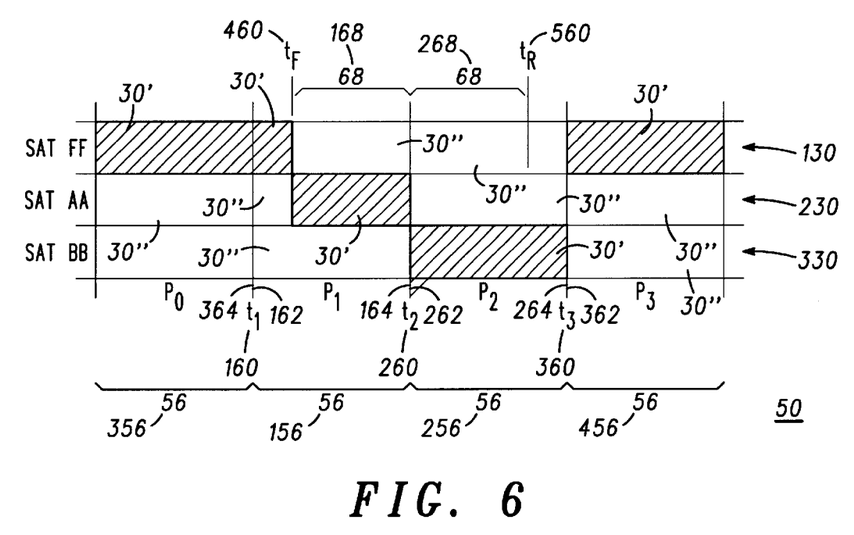
FIG. 6 shows a timeline depicting beam fill-in sequences in accordance with a preferred embodiment of the present invention.
Figure 7:
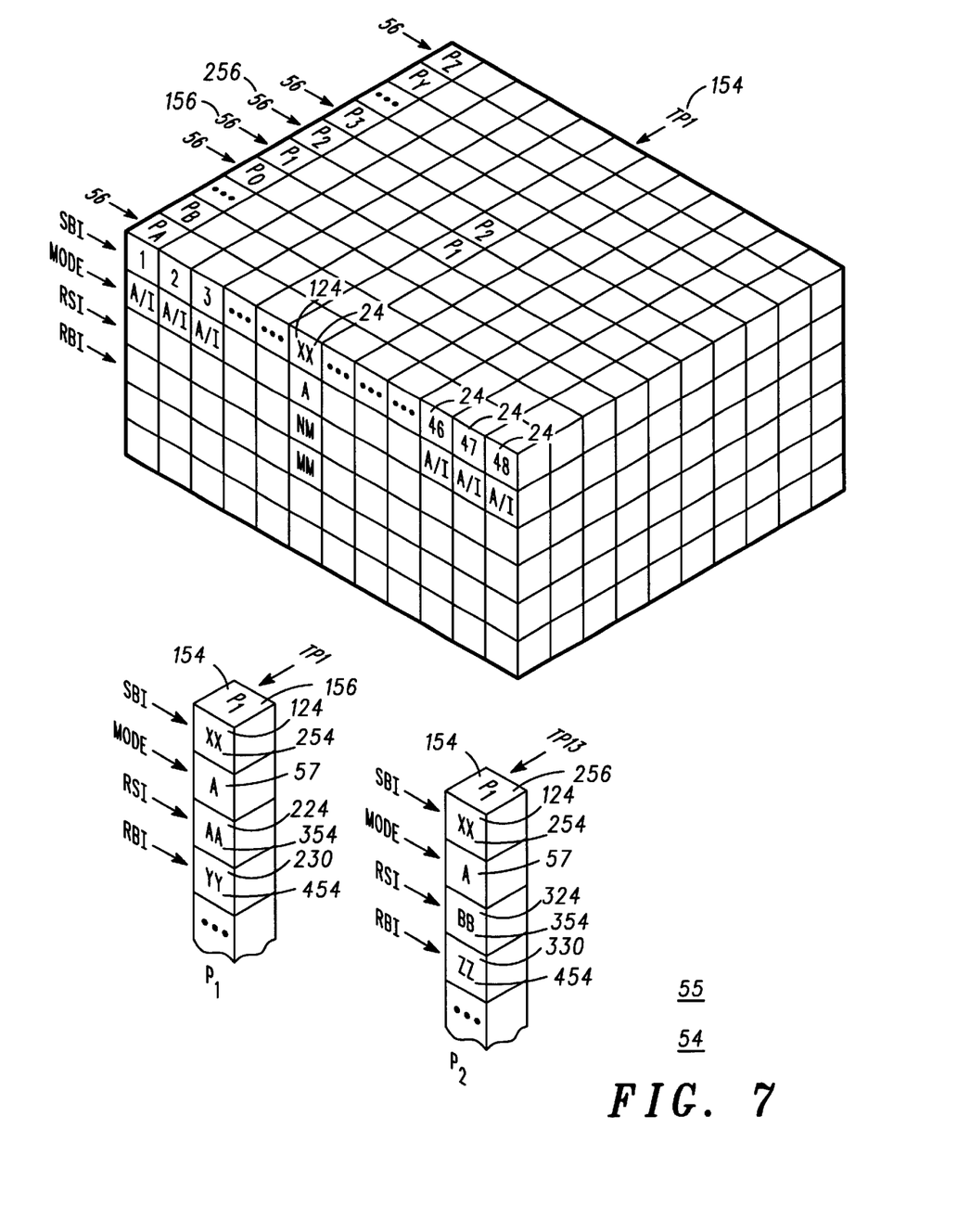
FIG. 7 shows a schematic of a beam-replacement table incorporated within a one-orbit table of a satellite in accordance with a preferred embodiment of the present invention.
Figure 8:
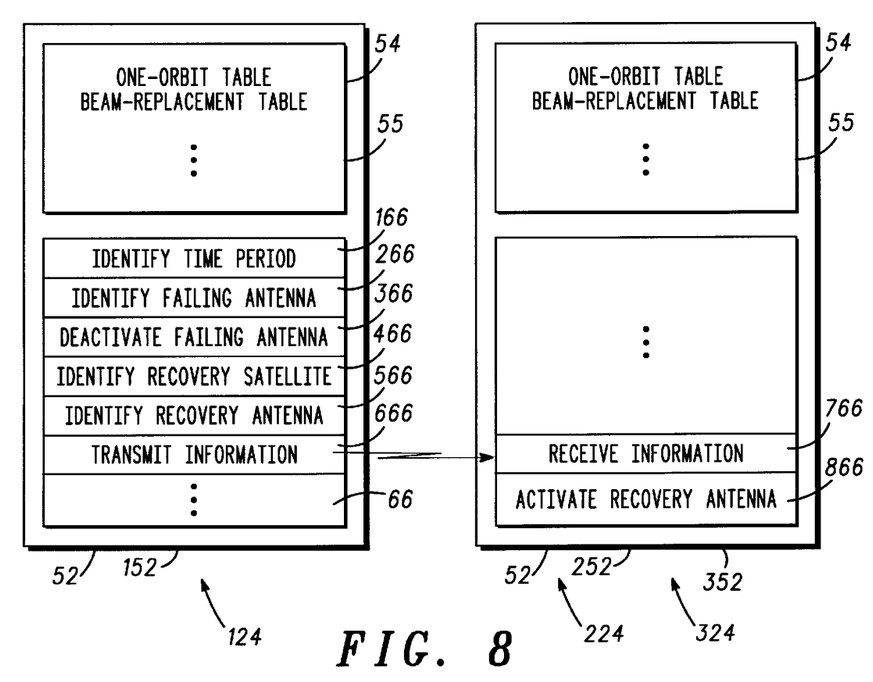
FIG. 8 shows a schematic of computer-readable media in a subject and a recovery satellite in accordance with a preferred embodiment of the present invention.
Figure 9:
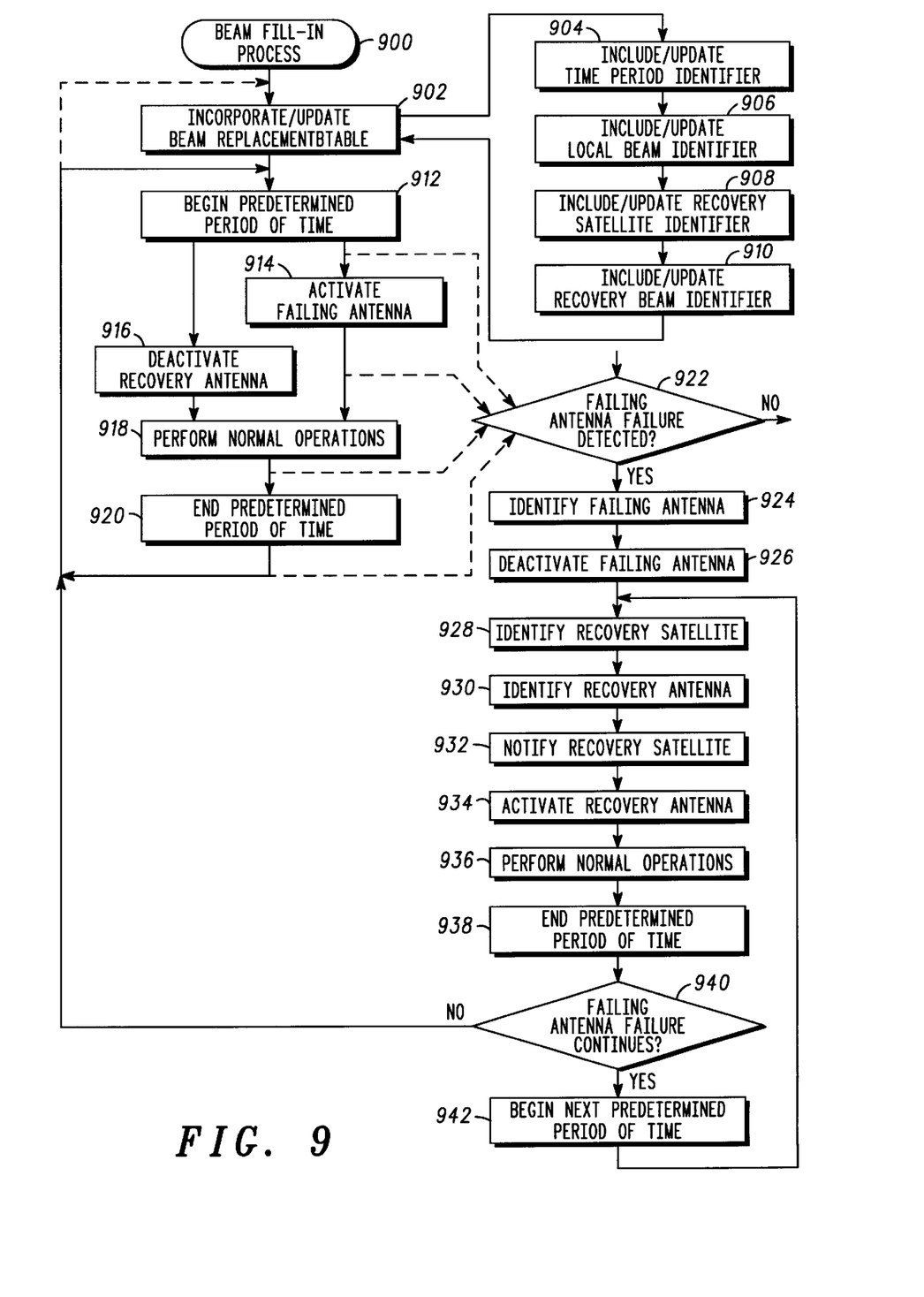
FIG. 9 shows a flowchart of a beam fill-in process in accordance with a preferred embodiment of the present invention.

Since the majority of overlapping cells 36 are dynamically overlapping, i.e., overlap only for short periods of time, the preferred embodiment of system 40 takes a dynamic approach to beam fill-in. FIGS. 5 and 6 show a map 48 and a timeline 50, respectively, depicting beam fill-in sequences, FIG. 7 shows a schematic of a beam-replacement table 54 incorporated within a one-orbit table 55 of subject satellite 124, FIG. 8 shows a schematic of computer-readable media 52 in subject satellite 124 and recovery satellite 224, and FIG. 9 shows a flowchart of a beam fill-in process 900 in accordance with a preferred embodiment of the present invention. The following discussion refers to FIGS. 5 through 9.

Beam fill-in process 900 begins with a task 902 in which a unique beam-replacement table 54 is initially incorporated and periodically updated in each satellite 24 of network 20. In FIG. 8, an exemplary beam-replacement table 54 for subject satellite 124 is demonstrated.

Task 902 incorporates and/or updates beam-replacement table 54 via a series of subtasks which are performed for each satellite 24 in network 20. As depicted in FIG. 7, beam-replacement table 54 may be incorporated into one-orbit table 55 provided as a part of the primary operating system (not shown) of each satellite 24. Those skilled in the art will appreciate that the manner in which beam-replacement table 54 is realized is not germane to this discussion nor the spirit of the present invention.

A subtask 904 includes and/or updates a time-period identifier (TPI) 154 for each predetermined period of time 56 (hereinafter period 56) occurring between updates of beam-replacement table 54, i.e., between iterations of task 902. In exemplary beam-replacement table 54 of FIG. 8, time-period identifier 154 identifies a first predetermined period of time ($p_1$) 156 (hereinafter first period 156) and a second predetermined period of time ($p_2$) 256 (hereinafter second period 256) are demonstrated.

A subtask 906 includes and/or updates a subject-beam identifier (SBI) 254 for each beam 32 (i.e., antenna 30) of the specific satellite 24 for each period 56. In exemplary beam-replacement table 54 of FIG. 8, subject-beam identifier 254 identifies "antenna XX" of subject satellite 124 as subject antenna 130 for both first period 156 and second period 256.

For exemplary purposes, FIG. 7 depicts a desired mode 57 of subject antenna 130 during normal operation. Mode 57 may be either active ("A") or inactive ("B"). Mode 57 is not technically a part of beam-replacement table 54, but is typical of other data that may be included therein.

A subtask 908 includes and/or updates a recovery-satellite identifier (RSI) 354 for each antenna 30 of subject satellite 124 for each period 56. In the exemplary beam-replacement table 54 of FIG. 8, recovery-satellite identifier 354 identifies "satellite AA" as recovery satellite 224 during first period 156 and "satellite BB" as another recovery satellite 324 during second period 256.

A subtask 910 includes and/or updates a recovery-beam identifier (RBI) 454 for each antenna 30 of subject satellite 124 for each period 56. In the exemplary beam-replacement table 54 of FIG. 8, recovery-beam identifier 454 identifies "antenna YY" of recovery satellite 224 as recovery antenna 230 during first period 156 and "antenna ZZ" of recovery satellite 324 as another recovery antenna 330 during second period 256.

Process 900 typically iterates task 902 for some integer number of periods 56. Those skilled in the art will appreciate that task 902 may be iterated for any convenient interval, and that variations in this iteration interval do not affect the spirit of the present invention.

Those skilled in the art will also appreciate that, since each satellite 24 has a unique beam-replacement table 54, the contents of any given beam-replacement table 54 may not be restricted to a single satellite 24. For example, recovery-beam identifier 454 may reside in beam-replacement table 54 in recovery satellite 224, along with a subject-satellite identifier (not shown) and a failed-beam identifier (not shown) with which recovery-beam identifier 454 is associated.

Similarly, the contents of any given beam-replacement table 54 need not be restricted to time-period identifier 154, subject-beam identifier 254, recovery-satellite identifier 354, and recovery-beam identifier 454. It may be desirable for beam-replacement table 54 to contain other data relevant to proper operation of either satellite 24, system 40, or network 20, such as mode 57, exemplified in FIG. 7. Variations in the content, arrangement, and location of elements of beam-replacement table 54 from those of the preferred embodiment discussed herein do not depart from the spirit of the present invention.

In map 48 of FIG. 5, three satellites 24 are shown in three orbits 26 above surface 34. These three satellites 24 form three cells 36 which describe three loci 58 over surface 34 for four consecutive periods 56, i.e., a preceding predetermined period of time ($p_0$) 356 (hereinafter preceding period 356), first period 156, second period 256, and a following predetermined period of time ($p_4$) 456 (hereinafter following period 456).

For purposes of this discussion, it will be assumed that network 20 intends subject antenna 130 to be an active antenna 30' during preceding period 356, first period 156, second period 256, and following period 456.

Referring to FIGS. 5, 6, and 9 for normal (non-failing) operation, subject antenna 130 is an active antenna 30' during preceding period 356. At a first time ($t_1$) 160, process 900 follows task 902 with a pseudotask 912 marking a beginning 62 of a next period 56, i.e., a beginning 162 of first period 156. An end 364 of preceding period 356 and beginning 162 of first period 156 occur at first time ($t_1$) 160.

It should be understood that process 900 is executed substantially simultaneously in all satellites 24 of network 20. First period 156 begins and ends at substantially the same times everywhere. It is this synchroneity that allows system 40 to provide dynamic beam fill-in.

Process 900, if subject antenna 130 is not already active, performs a task 914 in subject satellite 124 to activate subject antenna 130 for first period 156. Process 900 also, if recovery antenna 230 is not already inactive, performs a task 916 in recovery satellite 224 to deactivate recovery antenna 230 for first period 156.

Once subject antenna 130 is an active antenna 30' and recovery antenna 230 is an inactive antenna 30", process 900 performs an undefined task group 918 wherein process 900 performs all normal operations of subject satellite 124 and subject cell 136 from beginning 162 to an end 164 of first period 156. That is, between first time ($t_1$) 160 and a second time ($t_2$) 260. Second time ($t_2$) 260 marks end 164 of first period 156 and a beginning 262 of second period 256.

Process 900 then performs a pseudotask 920 marking an end 64 end of the current period 56, i.e., end 164 of first period 156, and returns to pseudotask 912 (or task 902) to process second period 256. Assuming normal operation, the preceding scenario for process 900 continues indefinitely.

As may be seen in map 48 of FIG. 5, during normal operation subject satellite 124 traverses an orbit 126. Upon subject satellite 124, subject antenna 130 is an active antenna 30' and forms subject beam 132 and subject cell 136. As subject satellite 124 traverses orbit 126, subject cell 136 traverses a locus 158 over surface 34. Because subject antenna 130 did not fail (normal operation), recovery antennas 230 and 330 are inactive antennas 30". Therefore, orbits 226 and 326 of recovery satellites 224 and 324 and loci 258 and 358 of recovery cells 236 and 336 are irrelevant.

Those skilled in the art will appreciate that tasks 912, 914, 916, 918, and 920 of process 900 thus far described, i.e., as process 900 applies to normal operation, may be performed as a part of normal operating systems of the satellites 24 of network 20. These tasks are described herein as a part of process 900 solely to provide reference and clarity for abnormal operation (operation in which subject antenna 130 does fail) discussed hereinafter. Exclusion or alteration of the aforementioned task does not depart from the spirit of the present invention.

As depicted in FIGS. 5 and 6, during first period 156 subject antenna 130 forms subject cell 136 at a first location 144 on surface 34, and recovery antenna 230 forms recovery cell 236 at least partially coincident with subject cell 136. Similarly, during second period 256, subject antenna 130 forms subject cell 136 at a second location 244 on surface 34, and recovery antenna 330 forms recovery cell 336 at least partially coincident with subject cell 136.

Referring to FIGS. 5 through 9, at beginning 162 of first period 156, subject antenna 130 is an active antenna 30' and recovery antenna 230 is an inactive antenna 30". Communication between first location 144 and network 20 takes place via subject cell 136, subject beam 132, and subject antenna 130.

Process 900 performs a task 922 to check for a failure of subject antenna 130. In the preferred embodiment, each satellite 24 of network 20 continuously and/or repetitively performs task 922 substantially simultaneously throughout and between tasks 912, 914, 918, and 920, i.e., throughout first period 156 from first time 160 through second time 260. Those skilled in the art will appreciate that code (not shown) to implement task 922 may be written as a subroutine or an interrupt routine of the primary operating system. Realizing the code for task 922 in any particular form does not depart from the spirit of the present invention.

If task 922 detects no failure, then operation is normal and process 900 continues as previously described.

If task 922 in subject satellite 124 detects a failure of subject antenna 130, then process 900 engages a computer program 66 (FIG. 8) to facilitate execution of beam fill-in tasks discussed hereinbelow. The computer program, in addition to computer software, may include embedded firmware or a suitable ASIC (Application Specific Integrated Circuit). Task 922 may detect a failure of subject antenna 130 through internal testing within subject satellite 124, though a failure of subject antenna 130 to transmit communications originating within subject satellite 124, through a notification by another satellite 24 of a failure of subject antenna 130 to receive communications originating from that other satellite 24, or through other actions well known to those skilled in the art.

Program 66 is made up of a plurality of code segments contained in computer-readable media 52. Because program 66 affects elements of both subject satellite 124 and recovery satellite 224, some portions of program 66 exist in a first computer-readable medium 152 in subject satellite 124 while other portions of program 66 exist in a second computer-readable medium 252 in recovery satellite 224 and a third computer-readable medium 352 in recovery satellite 324.

Assuming, for purposes of this discussion, that subject antenna 130 fails during first period 156, i.e., at an unspecified failure time ($t_F$) 460 (FIG. 6) after beginning 162 and before end 164 of first period 156. Communication between first location 144 and network 20 ceases and task 922 detects the failure of subject antenna 130.

Process 900 performs a task 924 to identify the subject antenna. In task 924, code segments 166 and 266 of program 66 are executed within subject satellite 124 to access time-period identifier 154 and subject-beam identifier 254 in beam-replacement table 54, respectively. In the exemplary beam-replacement table 54 of FIG. 8, "antenna XX" of subject satellite 124 is subject antenna 130.

Process 900 then performs a task 926 to deactivate the subject antenna. Subject antenna 130 is deactivated when subject satellite 130 takes subject antenna 130 off-line, i.e., no longer recognizes subject antenna 130 as an appropriate antenna 30 for communications between subject satellite 124 and other elements of network 20.

In task 926, a code segment 366 of program 66 is executed within subject satellite 124 to deactivate subject antenna 130. Subject antenna 130 is deactivated substantially at failure time ($t_F$) 460, and will remain an inactive antenna 30" for a remainder 68 of the current period 56, i.e., for a remainder 168 of first period 156.

Process 900 then performs a task 928 to identify the recovery satellite. In task 928, a code segment 466 of program 66 is executed within subject satellite 124 to access time-period identifier 154 and recovery-satellite identifier 354 in beam-replacement table 54, respectively. In the exemplary beam-replacement table 54 of FIG. 8, "satellite AA" is recovery satellite 224 for first period 156. As subject satellite 124 traverses orbit 126 and forms subject cell 136 traversing locus 158, so recovery satellite 224 traverses orbit 226 and forms recovery cell 236 traversing locus 258. Locus 258 is such that recovery cell 236 is at least partially coincident with subject cell 136 during first period 156.

Process 900 then performs a task 930 to identify the recovery antenna. In task 930, a code segment 566 of program 66 is executed within subject satellite 124 to access time-period identifier 154 and recovery-beam identifier 454 in beam-replacement table 54, respectively. In the exemplary beam-replacement table 54 of FIG. 8, "antenna YY" of recovery satellite 224 is recovery antenna 230 for first period 156.

Process 900 then performs a task 932 to notify the recovery satellite that the recovery antenna is to be activated. In task 932, a code segment 666 of program 66 is executed within subject satellite 124 to transmit beam fill-in information (i.e., the identity of recovery antenna 230) over inter-satellite signal 46 to recovery satellite 224, where a code segment 766 of program 66 is executed within recovery satellite 224 to receive the information.

Process 900, now in recovery satellite 224, then performs a task 934 to activate the recovery antenna. Recovery antenna 230 is activated when recovery satellite 224 places recovery antenna 230 on-line, i.e., recognizes recovery antenna 230 as an appropriate antenna 30 for communications between subject satellite 124 and other elements of network 20.

In task 934, a code segment 866 of program 66 is executed within recovery satellite 224 to activate recovery antenna 230. Recovery antenna 230 is activated substantially at failure time ($t_F$) 460, and will remain an active antenna 30' for remainder 168 of first period 156, i.e., through second time ($t_2$) 260.

Subject cell 136 is now an inactive cell 36" and recovery cell 236 is now an active cell 36'. Communications between first location 144 and network 20 may take place via recovery cell 236, recovery beam 232, and recovery antenna 230.

Process 900 then performs an undefined task group 936. In task group 936, process 900 performs all normal operations of recovery satellite 224 and recovery cell 236 from failure time ($t_F$) 460 through second time ($t_2$) 260, end 164 of first period 156.

Process 900 then performs a pseudotask 938 marking an end 64 of the current period 56, i.e., end 164 of first period 156.

Process 900 then performs a task 940 to check the status of subject antenna 130. Assuming, for the purposes of this discussion, that subject antenna 130 is still inoperative at second time 260, then task 940 will detect this state of failure. Process 900 follows task 940 with a pseudotask 942 marking a beginning 62 of a next period 56, i.e., beginning 262 of second period 256. Other beam recoveries may be initiated while a first recovery is being processed.

Process 900 then loops back to and performs task 928 to identify the recovery satellite. In the exemplary beam-replacement table 54 of FIG. 8, "satellite BB" is recovery satellite 324 for second period 256. As subject satellite 124 traverses orbit 126 and forms subject cell 136 traversing locus 158, so recovery satellite 324 traverses orbit 326 and forms recovery cell 336 traversing locus 358. Locus 358 is such that recovery cell 336 is at least partially coincident with subject cell 136 during second period 256.

Process 900 then performs task 930 to identify the recovery antenna. In the exemplary beam-replacement table 54 of FIG. 8, "antenna ZZ" of recovery satellite 324 is recovery antenna 330 for second period 256.

Process 900 performs task 932 to notify recovery satellite 324 that recovery antenna 330 is to be activated. Process 900, now in recovery satellite 324, performs task 934 to activate recovery antenna 330. Recovery antenna 330 is activated substantially at second time ($t_2$) 260, and will remain an active antenna 30' for a remainder 268 of second period 256, i.e., through third time ($t_3$) 360.

Subject cell 136 is now an inactive cell 36" and recovery cell 336 is now an active cell 36'. Communications between second location 244 and network 20 may take place via recovery cell 336, a recovery beam 332, and recovery antenna 330.

Process 900 then performs undefined task group 936. In task group 936, process 900 performs all normal operations of recovery satellite 324 and recovery cell 336 from second time ($t_2$) 260 through third time ($t_3$) 360. Third time 360 marks an end 264 of second period 256 and a beginning 462 of following period 456.

Process 900 then performs pseudotask 938 marking end 264 of second period 256.

Process 900 then performs task 940 to check the status of subject antenna 130. Assuming, for the purposes of this discussion, that subject antenna 130 became operative at an undefined recovery time ($t_R$) 560 during second period 256, i.e., between second time 260 and third time 360, task 940 will detect this state of recovery. At third time ($t_3$) 360, process 900 will return to task 912 (or to task 902) and proceed as previously discussed. It should be noted that subject antenna 130 may remain an inactive antenna 30" through the end of second period 256 even though a return to operability occurred at recovery time ($t_R$) 560, well before end 264 of second period 256.

In summary, the present invention teaches a system 40 and a process 900 for providing dynamic beam fill-in in the event of a failure of beam 32 (i.e., antenna 30) in a satellite-based cellular communications network 20 through the use of at least partially coincident communications cells 36.

The present invention also teaches a system 40 to replace a failed cell 136 formed by a failed subject antenna 130 on a subject satellite 124 with a recovery cell 236 formed by a recovery antenna 230 on a recovery satellite 224 within a cellular communications network 20.

The present invention also teaches a beam-replacement table 54 associated with a subject satellite 124 in a cellular communications network 20, where the beam-replacement table is configured to identify a predetermined period of time 56, configured to identify a subject antenna 130 of that subject satellite 124 forming a subject cell 136 for that predetermined period of time 56, configured to identify a recovery satellite 224 having a recovery antenna forming a recovery cell 236 at least partially coincident with that subject cell 136, and configured to identify that recovery antenna 230.

The present invention also teaches a communications network 20 having satellites 24 in substantially low-Earth polar orbits, where those satellites 24 form footprints 38 that dynamically overlap upon the surface 34 of the Earth, and where those footprints tend to have greater overlap proximate the poles than proximate the equator, thus providing greater potential for beam fill-in in the temperate regions where population density and the resultant communications burden are maximal, than in the tropical regions where population density and communications burden are minimal.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A system for dynamic beam fill-in in a cellular communications network having a constellation of satellites in orbit above a surface of the Earth, said beam fill-in system comprising:

a first satellite in said constellation having a first antenna configured to form a first cell upon said surface of the Earth, wherein said first antenna is an active antenna;

a second satellite in said constellation having a second antenna configured to form a second cell upon said surface of the Earth, wherein said second cell is at least partially coincident with said first cell, and wherein said second antenna is an inactive antenna; and a beam-replacement table associated with said first satellite and configured to identify said second satellite, wherein, in the event of a failure of said first antenna, said first satellite deactivates said first antenna and said second satellite activates said second antenna in response to said table.

2. A beam fill-in system as claimed in claim 1 additionally comprising:

a subject-beam identifier contained within said beam-replacement table and identifying said first antenna; and a recovery-satellite identifier contained within said beam-replacement table, associated with said subject-beam identifier, and configured to identify said second satellite.

3. A beam fill-in system as claimed in claim 2 wherein said beam-replacement table is a first beam-replacement table, said system additionally comprising:

a recovery-beam identifier contained in one of said first beam-replacement table and a second beam-replacement table associated with said second satellite, said recovery-beam identifier being associated with said recovery-satellite identifier, and configured to identify said second antenna.

4. A beam fill-in system as claimed in claim 3 additionally comprising a computer program embodied on a computer-readable medium, said computer program comprising:

a first code segment for identifying said first antenna from said subject-beam identifier;

a second code segment for identifying said second satellite from said recovery-satellite identifier;

a third code segment for identifying said second antenna from said recovery-beam identifier;

a fourth code segment for deactivating said first antenna in response to said first code segment; and a fifth code segment for activating said second antenna in response to said third code segment.

5. A beam fill-in system as claimed in claim 1 wherein:

said first satellite activates said first antenna for a predetermined period of time; and said second antenna is configured to form said second cell during said predetermined period of time.

6. A beam fill-in system as claimed in claim 5 wherein said beam-replacement table comprises:

a time-period identifier configured to identify said predetermined period of time;

a subject-beam identifier associated with said time-period identifier and configured to identify said first antenna;

a recovery-satellite identifier associated with said subject-beam identifier and configured to identify said second satellite; and a recovery-beam identifier associated with said recovery-satellite identifier and configured to identify said second antenna.

7. A beam fill-in system as claimed in claim 6 additionally comprising a computer program embodied on a computer-readable medium and configured to be executed in the event of said failure of said first antenna, said computer program comprising:

a first code segment for identifying said predetermined period of time from said time-period identifier;

a second code segment for identifying said first antenna from said subject-beam identifier associated with said time-period identifier;

a third code segment for identifying said second satellite from said recovery-satellite identifier associated with said subject-beam identifier;

a fourth code segment for identifying said second antenna from said recovery-beam identifier;

a fifth code segment for deactivating said first antenna for a remainder of said predetermined period of time in response to said second code segment; and a sixth code segment for activating said second antenna for said remainder of said predetermined period of time in response to said fourth code segment.

8. A beam fill-in system as claimed in claim 1 wherein:

said system comprises a subconstellation of satellites within said constellation, wherein said satellites of said subconstellation have antennas configured to form cells at least partially coincident with said first cell; and said beam-replacement table is configured to identify said second satellite as a satellite within said subconstellation having an antenna configured to produce a cell more coincident with said first cell than said cells of other satellites of said subconstellation are configured to produce.

9. A beam fill-in system as claimed in claim 1 wherein:

said first satellite forms said first cell at a plurality of locations upon said surface of the Earth during a plurality of predetermined periods of time;

others of said satellites form cells upon said surface of the Earth at least partially coincident with said first cell during said plurality of predetermined periods of time; and said second satellite, during each of said plurality of predetermined periods of time, forms a cell more coincident with said first cell than said cells of said others of said satellites during each of said plurality of predetermined periods of time.

10. A method of providing dynamic beam fill-in for a cellular communications network having a constellation of satellites in orbit above a surface of the Earth, wherein each of said satellites has a plurality of antennas and each of said plurality of antennas is configured to form a cell upon said surface of the Earth, said beam fill-in method comprising:

a) activating, in a first satellite of said satellites, a first antenna configured to form a first cell upon said surface of the Earth;

b) deactivating, in a second satellite of said satellites, a second antenna configured to form a second cell upon said surface of the Earth at least partially coincident with said first cell;

c) detecting a failure of said first antenna;

d) identifying said second satellite;

e) deactivating said first antenna in response to said detecting operation c); and f) activating said second antenna in response to said identifying operation d).

11. A beam fill-in method as claimed in claim 10 additionally comprising:

including, in a beam-replacement table in said first satellite, a subject-beam identifier configured to identify said first antenna; and including, in said beam-replacement table, a recovery-satellite identifier associated with said subject-beam identifier and configured to identify said second satellite.

12. A beam fill-in method as claimed in claim 11 additionally comprising including, in said beam-replacement table, a recovery-beam identifier associated with said recovery-satellite identifier and configured to identify said second antenna.

13. A beam fill-in method as claimed in claim 10 additionally comprising:

incorporating a beam-replacement table within said first satellite;

including, in said beam-replacement table, a time-period identifier configured to identify a predetermined period of time during which said first antenna is configured to form said first cell;

including, in said beam-replacement table, a subject-beam identifier associated with said time-period identifier and configured to identify said first antenna;

including, in said beam-replacement table, a recovery-satellite identifier associated with said subject-beam identifier and configured to identify said second satellite; and including, in said beam-replacement table, a recovery-beam identifier associated with said recovery-satellite identifier and configured to identify said second antenna.

14. A beam fill-in method as claimed in claim 13 wherein:

said deactivating operation e) deactivates said first antenna during said predetermined period of time; and said activating operation f) activates said second antenna during said predetermined period of time.

15. A beam fill-in method as claimed in claim 10 wherein:

said activating operation a) activates said first antenna for a predetermined period of time;

said deactivating operation b) deactivates said second antenna for said predetermined period of time;

said detecting operation c) detects said failure of said first antenna during said predetermined period of time;

said deactivating operation e) deactivates said first antenna for a remainder of said predetermined period of time; and said activating operation f) activates said second antenna for substantially said remainder of said predetermined period of time.

16. A system for dynamic beam fill-in in a cellular communications network having a constellation of satellites in orbit above a surface of the Earth, wherein each of said satellites has a plurality of antennas configured to form cells upon said surface of the Earth, said beam fill-in system comprising:

a first antenna configured to form a first cell at a first location upon said surface of the Earth for a first predetermined period of time and configured to form said first cell at a second location upon said surface of the Earth for a second predetermined period of time;

a second antenna configured to form a second cell upon said surface of the Earth at least partially coincident with said first cell for said first predetermined period of time;

a third antenna configured to form a third cell upon the surface of the Earth at least partially coincident with said first cell for said second predetermined period of time;

a beam-replacement table contained in a first computer-readable medium, configured to identify and associate said first antenna and said second antenna during said first predetermined period of time, and configured to identify and associate said first antenna and said third antenna during said second predetermined period of time; and a computer program contained in a second computer-readable medium wherein, in response to said beam-replacement table, said computer program is configured to deactivate said first antenna and activate said second antenna in the event of a failure of said first antenna during said first predetermined period of time.

17. A beam fill-in system as claimed in claim 16 wherein said computer program is configured to deactivate, in response to said beam-replacement table, said first antenna and activate said third antenna in the event of said failure of said first antenna during said second predetermined period of time.

18. A beam fill-in system as claimed in claim 16 wherein:

said first antenna is activated at a beginning of said first predetermined period of time;

said second antenna is deactivated at said beginning of said first predetermined period of time; and said third antenna is deactivated at a beginning of said second predetermined period of time.

19. A beam fill-in system as claimed in claim 16 wherein said beam-replacement table comprises:

a time-period identifier configured to identify each of said first predetermined period of time and said second predetermined period of time;

a subject-beam identifier associated with said time-period identifier and configured to identify said first antenna;

a recovery-satellite identifier associated with said subject-beam identifier and configured to identify which satellite of said constellation has said second antenna during said first predetermined period of time and said third antenna during said second predetermined period of time; and a recovery-beam identifier associated with said recovery-satellite identifier and configured to identify said second antenna during said first predetermined period of time and said third antenna during said second predetermined period of time.

20. A beam fill-in system as claimed in claim 19 wherein said second computer-readable medium is located on a satellite having said first antenna.

* * * * *